United States Patent
Van Laere

(10) Patent No.: US 10,455,166 B2
(45) Date of Patent: Oct. 22, 2019

(54) THERMAL IMAGING SENSOR WHICH CONNECTS TO BASE UNITS AND MAKES THERMAL TEMPERATURE DATA AVAILABLE OVER INDUSTRIAL PROTOCOLS TO MONITORING SYSTEMS

(71) Applicant: Maarten Van Laere, Heverlee (BE)

(72) Inventor: Maarten Van Laere, Heverlee (BE)

( * ) Notice: Subject to any disclaimer, the term of this patent is extended or adjusted under 35 U.S.C. 154(b) by 0 days.

(21) Appl. No.: 15/365,681

(22) Filed: Nov. 30, 2016

(65) Prior Publication Data

US 2017/0155851 A1   Jun. 1, 2017

Related U.S. Application Data

(60) Provisional application No. 62/261,684, filed on Dec. 1, 2015.

(51) Int. Cl.

| | |
|---|---|
| *H04N 5/33* | (2006.01) |
| *H04N 7/18* | (2006.01) |
| *H04N 1/00* | (2006.01) |
| *G01J 5/10* | (2006.01) |
| *G01J 5/00* | (2006.01) |

(52) U.S. Cl.
CPC ............. *H04N 5/33* (2013.01); *G01J 5/10* (2013.01); *H04N 1/00209* (2013.01); *H04N 7/181* (2013.01); *G01J 2005/0077* (2013.01); *G01J 2005/0085* (2013.01)

(58) Field of Classification Search
None
See application file for complete search history.

(56) References Cited

U.S. PATENT DOCUMENTS

| | | | | |
|---|---|---|---|---|
| 2013/0063592 | A1* | 3/2013 | Kingsley | H04N 7/181 348/143 |
| 2014/0306833 | A1* | 10/2014 | Ricci | B60Q 1/00 340/901 |
| 2015/0022666 | A1* | 1/2015 | Kay | H04L 67/025 348/159 |
| 2015/0248754 | A1* | 9/2015 | Graner | G06K 9/00771 382/103 |
| 2015/0312490 | A1* | 10/2015 | Hoelter | H04N 5/33 348/164 |

(Continued)

*Primary Examiner* — Reza Aghevli
(74) *Attorney, Agent, or Firm* — White-Welker & Welker, LLC; Matthew T. Welker, Esq.

(57) ABSTRACT

A Thermal Imaging Sensor for providing a new innovative way for monitoring temperature in critical facilities. The thermal imaging sensor(s) connect to base units using wired or wireless connectivity. The thermal image data is transformed into numeric temperature data either by the sensor or the base unit. This image into numeric temperature data conversion allows for thermal data integration with monitoring, management and or automation applications using SNMP, Modbus, Bacnet, XML, JSON, HTTP, Serial over IP, any other IP based protocol or serial protocol so that the sensor can be used by monitoring and/or automation systems. With the present invention, a thermal imaging sensor is automatically recognized by applications as any other temperature sensor while having all the benefits from thermal imaging compared to traditional temperature sensors. It also connects to a base unit like any other regular sensor. The thermal imaging sensor in the present invention is not a standalone unit.

18 Claims, 1 Drawing Sheet

(56) References Cited

U.S. PATENT DOCUMENTS

2016/0374016 A1* 12/2016 Zhu .................. H04W 52/0209
2017/0041867 A1*  2/2017 Itagaki ................ H04W 52/245
2017/0048825 A1*  2/2017 Itagaki .................. H04W 64/00

* cited by examiner

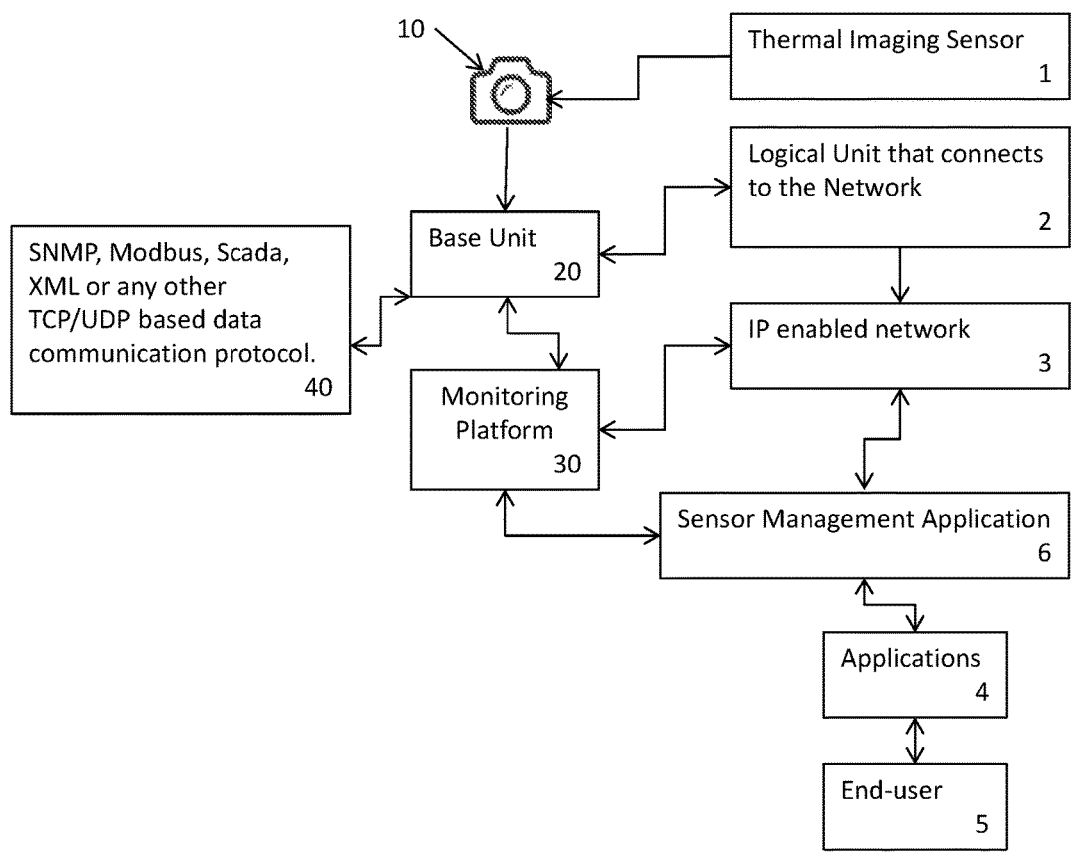

THERMAL IMAGING SENSOR WHICH CONNECTS TO BASE UNITS AND MAKES THERMAL TEMPERATURE DATA AVAILABLE OVER INDUSTRIAL PROTOCOLS TO MONITORING SYSTEMS

CROSS REFERENCE TO RELATED APPLICATIONS

This application claims priority from U.S. Patent Application Ser. No. 62/261,684, entitled "A thermal imaging sensor which connects to base units and makes thermal temperature data available over industrial protocols to monitoring systems", filed on 1 Dec. 2015. The benefit under 35 USC § 119 of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE PRESENT INVENTION

The present invention relates generally to a temperature sensor. More specifically, the present invention relates to a new kind of temperature sensor that also connects to a base unit but provides a new innovative way for monitoring temperature while still integrating in the same way with the applications as if it were a traditional temperature sensor.

BACKGROUND OF THE PRESENT INVENTION

Temperature sensors are deployed to monitor continuously or at intervals the thermal conditions in critical facilities or any other location. Such sensors typically connect to a base unit using a wired or wireless connection. Two types of temperature sensors are commonly used: ambient temperature sensors giving you the temperature reading of the air where the sensor is located; or contact temperature sensors which provide you with the temperature of the object to which the sensor is connected to. The base unit, to which sensors are connected, communicates over IP based protocols to applications for monitoring, reporting, alerting, logging, controlling and analysis purposes. Those industrial protocols typically get their data as a numeric or string data for temperature.

The present invention relates generally to a new kind of temperature sensor that also connects to a base unit but provides a new innovative way for monitoring temperature while still integrating in the same way with the applications as if it were a traditional temperature sensor.

Secondly, the present invention solves the issue whereby traditional temperature sensors do not cover an area but only report the thermal values where the sensor is located (ambient or contact temperature). Thermal imaging sensing technology measures temperature in the field of view of the thermal camera. It covers an area.

By using thermal imaging sensing technology, the present invention change the way temperature monitoring is done while seamlessly integrating with the existing monitoring applications. This new sensor connects to a base unit just like if it were a traditional temperature sensor. By converting the thermal image into numeric temperature data (in the sensor and/or base unit), it integrates with monitoring platforms as if it were a traditional temperature sensor.

SUMMARY OF THE PRESENT INVENTION

The present invention generally relates to a sensor which includes one or more thermal imaging cameras. The sensor is connected, like traditional sensors, in a wired or wireless way to a base unit. This base unit makes data from the thermal image available as digital temperature value(s) to applications through industrial communication protocols (SNMP, Modbus TCP, Bacnet, Scada), any other IP based communication protocol (like but not limited to XML, HTTP, JSON) or any other serial communication protocol. As previously explained, the thermal imaging sensors provide a new way of monitoring temperature compared to traditional temperature sensors while seamlessly integrating with applications using standard communication protocols.

There has thus been outlined, rather broadly, some of the features of the present invention in order that the detailed description thereof may be better understood, and in order that the present contribution to the art may be better appreciated. There are additional features of the present invention that will be described hereinafter.

In this respect, before explaining at least one embodiment of the present invention in detail, it is to be understood that the present invention is not limited in its application to the details of construction or to the arrangements of the components set forth in the following description or illustrated in the drawings. The present invention is capable of other embodiments and of being practiced and carried out in various ways. Also, it is to be understood that the phraseology and terminology employed herein are for the purpose of the description and should not be regarded as limiting.

Sensors typically connect to a base unit using a wired or wireless connectivity. An object is to provide a new kind of sensor which also connects to a base unit but by using thermal imaging camera(s) provides a new and innovative way for monitoring temperature in critical facilities.

Another object is to provide a system whereby the thermal imaging data is converted into digital temperature value(s) in a format so that it can be sent to or retrieved by applications via SNMP, Modbus, Bacnet, XML, Serial over IP, any other IP or non-IP based monitoring or automation network protocol. Those protocols typically can only transport digital sensor data and as such thermal image(s) need to be converted to numeric temperature value(s), hence the present invention. The conversion of thermal imaging data into digital temperature value(s) can either be done within the sensor and/or the base unit.

Other objects and advantages of the present invention will become obvious to the reader and it is intended that these objects and advantages are within the scope of the present invention. To the accomplishment of the above and related objects, the present invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

The accompanying drawings, which are incorporated herein and form a part of the specification, illustrate the present invention and, together with the description, further serve to explain the principles of the present invention and to enable a person skilled in the pertinent art to make and use the present invention.

FIG. 1 is a flowchart illustrating the overall operation of the present invention. Operation of the thermal imaging sensor that connects (wired or wirelessly) to a base unit. The base unit communicates temperature data over industrial & enterprise protocols so that data from the thermal images is translated into digital temperature value(s) which can be processed by monitoring and management platforms.

INDEX OF ELEMENTS

1. Thermal Imaging Sensor
2. Logic Unit
3. IP enabled network
4. Applications
5. End-user
6. A sensor management application
10: Thermal Imaging Camera Sensor
20: Base Unit
30: Monitoring Platform
40: Communication Protocols Definitions An application is any program, or group of programs, that is designed for the end user. Application software can be divided into two general classes: systems software and applications software. Applications software (also called end-user programs) include such things as database programs, word processors, Web browsers and spreadsheets.

Communication protocols in the present invention refers to IP based communication protocols between the base unit and the application(s).

Middleware is a hardware or software solution that sits between a base unit and an application. It could simply act as a pass-through, can perform operations on the data from the base unit (like but not limited to: pass-through, conversion, aggregation).

A computer network or data network is a telecommunications network which allows computers to exchange data. In computer networks, networked computing devices exchange data with each other using a data link. The connections between nodes are established using either cable media or wireless media. The best-known computer network is the Internet. Computer networks differ in the transmission medium used to carry their signals, communications protocols to organize network traffic, the network's size, topology and organizational intent. Computer networks support an enormous number of applications and services such as access to the World Wide Web, digital video, digital audio, shared use of application and storage servers, printers, and fax machines, and use of email and instant messaging applications as well as many others. In most cases, application-specific communications protocols are layered (i.e. carried as payload) over other more general communications protocols.

A platform is any hardware or software used to host an application or service. An application platform, for example, a monitoring platform, consists of hardware, an operating system and coordinating programs that use the instruction set for a particular processor or microprocessor.

DETAILED DESCRIPTION OF THE PRESENT INVENTION

In the following detailed description of the present invention of exemplary embodiments of the present invention, reference is made to the accompanying drawings (where like numbers represent like elements), which form a part hereof, and in which is shown by way of illustration specific exemplary embodiments in which the present invention may be practiced. These embodiments are described in sufficient detail to enable those skilled in the art to practice the present invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the present invention. However, it is understood that the present invention may be practiced without these specific details. In other instances, well-known structures and techniques known to one of ordinary skill in the art have not been shown in detail in order not to obscure the present invention. Referring to the figures, it is possible to see the various major elements constituting the apparatus of the present invention.

Now referring to the Figures, in which similar reference characters denote similar elements throughout the several views, the figures illustrate a thermal imaging sensor which connects to base units and makes thermal temperature data available over industrial protocols to monitoring systems.

Turning now descriptively to the drawings, in which similar reference characters denote similar elements throughout the several views, the figures illustrate one or more thermal imaging cameras 10 that are connected to a base unit which makes the temperature value(s) from thermal image(s) data available through SNMP, Modbus, Bacnet, XML, Serial over IP, or any other IP based protocol 40 that can be used by monitoring and/or automation systems.

The main component of thermal imaging sensor 1 consists of one or more thermal imaging camera's 10. The thermal camera 10 is a device that forms an image using infrared radiation, similar to a common camera that forms an image using visible light.

The data from thermal images can either be converted into one or more temperature values in the sensor itself or in the base unit 20 to which the sensor 1 is connected. This conversion feature can either be included in the sensor itself 1 and/or in the logic unit 2 of the base unit 20.

Typically, one or more thermal imaging sensors 1 would be connected directly through a wired and/or wireless connection with a base unit 20.

The first main element, the thermal image sensor 1, connects using a wired or wireless connectivity to a base unit 20. The base unit 20 is a device acting as the logical unit 2 and that is connected to an IP enabled network 3.

The base unit 20 is a logic unit 2 that makes the values of digital or analog sensors available over the IP enabled network 3 to one or more applications 4 and/or to the end-user 5, using different types of communication protocols 40.

The data could also be made directly available to users without requiring a sensor management application 6.

Typically, but not limited to, applications 4 would be monitoring or management platforms that enable to centrally monitor, report, and alert (or any combination thereof) sensors that are connected in one or more networks.

A non-limitative list of such applications: network monitoring systems, infrastructure monitoring software, DCIM, Scada systems, industrial automation platforms, building management systems.

A platform is any hardware or software used to host an application or service. An application platform, for example, a monitoring platform, consists of hardware, an operating system and coordinating programs that use the instruction set for a particular processor or microprocessor.

In specific setups, it may not always be possible to have a direct communication between the base unit 20 and the Application(s) 4 requiring some form of middleware. With respect to the present invention and this application, applications may also refer to middleware. Middleware is a hardware or software solution that sits between the base unit 20 and the applications 4. It could simply act as a pass-through, can perform operations on the data from the base unit (like but not limited to: pass-through, conversion, aggregation).

Applications in the present invention are any type and any combination of software (on-premises, cloud, embedded) that receives or retrieves directly or indirectly the values and/or alerts from the thermal imaging sensors using IP or serial based protocols like, but not limited to, SNMP, Modbus, Bacnet, XML, JSON, Serial over IP, any other IP based monitoring, serial communications or any other automation network protocol.

Applications may be able to communicate directly or indirectly with more than one base unit 20. One base unit 20 may be able to communicate directly with one or more monitoring applications 4.

Direct data retrieval or reception is when the Application(s) 4 communicate directly over IP 40 with the base unit 20.

The base unit 20 communicates with applications 4 (as described above) using IP or serial based network protocols 40.

Non-exhaustive examples of such communication network protocols are SNMP, Modbus, Bacnet, XML, JSON, Serial over IP, any other IP based protocol 40 that can be used by monitoring and/or automation systems.

Communication protocols in the present invention refers to IP based communication protocols between the base unit 20 and the application(s) 4.

Following is a non-exhaustive list of possible communication protocols between the base unit 20 and the application(s) 4: SNMP, Modbus, Scada, HTTP, JSON, XML, Serial over IP.

Connections of Main Elements and Sub-Elements of Invention. A typical implementation of the present invention would be a device that includes the features as described in the thermal imaging sensor 1. This device would then connect, directly or indirectly, using a wired or wireless connection with a base unit 20.

The base unit 20 connects to the IP network and makes the data available via IP network 3 or serial protocols to applications 4.

The present invention is for a thermal imaging sensor 1 that connects to a base unit 20 and converts the thermal image into digital temperature data which is shared over IP protocols 40 to applications 4 that require numeric sensor data.

In a traditional way of doing temperature monitoring, one would need to deploy multiple temperature sensors 1 to cover an area and get the temperature of objects using contact temperature sensors. By using thermal camera's 10 one can monitor the temperature of objects in an area covered by the field of view of the thermal camera 10.

Applications 4 as previously described traditionally read or receive numeric data from sensors over network protocols 40 like, but not limited to, SNMP, Modbus, Bacnet, JSON, HTTP, Serial over IP, XML. However thermal cameras 10 typically generate a thermal image as output which needs to be converted into numeric data is if where a traditional temperature sensor. The thermal camera sensor 1 itself connects to a base unit 20 using a wired or wireless connection.

What has been described and illustrated herein is a preferred embodiment of the present invention along with some of its variations. The terms, descriptions and figures used herein are set forth by way of illustration only and are not meant as limitations. Those skilled in the art will recognize that many variations are possible within the spirit and scope of the present invention in which all terms are meant in their broadest, reasonable sense unless otherwise indicated. Any headings utilized within the description are for convenience only and have no legal or limiting effect.

What has been described and illustrated herein is a preferred embodiment of the present invention along with some of its variations. The terms, descriptions and figures used herein are set forth by way of illustration only and are not meant as limitations. Those skilled in the art will recognize that many variations are possible within the spirit and scope of the present invention in which all terms are meant in their broadest, reasonable sense unless otherwise indicated.

Thus, it is appreciated that the optimum dimensional relationships for the parts of the present invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the present invention should be determined by the appended claims and their legal equivalents, rather than by the examples given.

The embodiments of the present invention in which an exclusive property or privilege is claimed are defined as follows:

1. A temperature sensing device comprising:
   a thermal imaging sensor;
   a base unit;
   one or more monitoring systems;
   the thermal imaging sensor connected to the base unit;
   the base unit connected to the one or more monitoring systems;
   the thermal imaging sensor determining temperature values;
   the thermal imaging sensor communicating temperature values to the base unit; and
   the base unit making temperature values available over industrial protocols to one or more monitoring systems.

2. The device of claim 1, wherein
   the thermal imaging sensor connects to the base unit and makes temperature values available over industrial protocols to monitoring systems.

3. The device of claim 1, wherein
   one or more thermal imaging cameras are connected to the base unit;
   the base unit determining temperature value(s) from thermal image(s) data;
   the base unit making temperature values available through an IP based protocol that can be used by monitoring and/or automation systems.

4. The device of claim 3, wherein the IP based protocol includes SNMP, Modbus, Bacnet, XML, and Serial over IP.

5. The device of claim 1, wherein
the main component of the thermal imaging sensor consists of one or more thermal imaging cameras; and
the thermal camera is a device that forms an image using infrared radiation.

6. The device of claim 5, wherein
the data from thermal images can either be converted into one or more temperature values in the sensor itself or in the base unit to which the sensor is connected.

7. The device of claim 6, wherein
the conversion feature can either be included in the sensor itself or in the logic unit of the base unit.

8. The device of claim 1, wherein
one or more thermal imaging sensors are connected directly through a wired and/or wireless connection with the base unit.

9. The device of claim 1, wherein
the thermal image sensor connects using a wired or wireless connectivity to the base unit;
the base unit is a device acting as a logical unit; and
the base unit is connected to an IP enabled network.

10. The device of claim 9, wherein
the base unit is a logic unit that makes the values of digital or analog sensors available over the IP enabled network to one or more applications and to the end-user, using different types of communication protocols.

11. The device of claim 10, wherein
the data is directly available to users without requiring a sensor management application.

12. The device of claim 11, further comprising
applications for monitoring or providing management platforms that enable central monitoring, reporting, control, and alerts that are connected in one or more networks.

13. The device of claim 12, wherein
a non-limitative list of such applications includes: network monitoring systems, infrastructure monitoring software, DCIM, SCADA systems, industrial automation platforms, and building management systems.

14. The device of claim 1, further comprising
middleware between the base unit and the applications.

15. The device of claim 1, further comprising
one or more applications that receive or retrieve, directly or indirectly, the values and/or alerts from the thermal imaging sensors using IP or serial based protocols over a communications network or by any automation network protocol.

16. The device of claim 15, wherein
applications communicate directly or indirectly with more than one base unit; and
at least one base unit communicates directly with one or more monitoring applications.

17. The device of claim 16, wherein
direct data retrieval or reception is when the applications communicate directly over IP 40 with the base unit; and
the base unit communicates with applications using IP or serial based network protocols.

18. The device of claim 1, wherein
the thermal imaging sensor is connected, directly or indirectly, using a wired or wireless connection with the base unit;
the base unit connects to the IP network and makes the data available via IP network or serial protocols to applications;
the thermal cameras generate a thermal image as output which needs to be converted into numeric data is if where a traditional temperature sensor; and
the thermal imaging sensor that connects to the base unit converts the thermal image into digital temperature data which is shared over IP protocols to applications that require numeric sensor data.

* * * * *